United States Patent [19]

Lee

[11] Patent Number: 4,976,100

[45] Date of Patent: Dec. 11, 1990

[54] SYSTEM AND METHOD FOR HEAT RECOVERY IN A COMBINED CYCLE POWER PLANT

[75] Inventor: Richard M. Lee, Media, Pa.

[73] Assignee: Westinghouse Electric Corp., Pittsburgh, Pa.

[21] Appl. No.: 359,531

[22] Filed: Jun. 1, 1989

[51] Int. Cl.$^5$ .............................................. F02C 6/18
[52] U.S. Cl. .............................. 60/39.02; 60/39.182; 60/657
[58] Field of Search ................. 60/39.02, 39.182, 657; 122/7 R, 488, 489

[56] References Cited

U.S. PATENT DOCUMENTS

| | | | |
|---|---|---|---|
| 3,756,023 | 9/1973 | Berman | 60/106 |
| 3,803,846 | 4/1974 | Letvin | 60/685 |
| 3,965,675 | 6/1976 | Martz et al. | 60/39.18 B |
| 4,353,206 | 10/1982 | Lee | 60/39.18 B |
| 4,354,347 | 10/1982 | Tomlinson et al. | 60/39.182 |
| 4,391,101 | 7/1983 | Labbe et al. | 60/646 |
| 4,465,027 | 8/1984 | Steinegger | 60/39.182 |
| 4,555,906 | 12/1985 | Martens et al. | 60/660 |
| 4,745,757 | 5/1988 | Kim | 60/39.182 |

OTHER PUBLICATIONS

R. R. Pierce, "Estimating Acid Dewpoints in Stack Gases", *Chemical Engineering*, Apr. 11, 1977, pp. 125-128.

R. W. Foster-Pegg, "Cogeneration-Interactions of Gas Turbine, Boiler and Steam Turbine", American Society of Mechanical Engineering, Paper No. 84-JPGC-GT-12, 1984.

*Primary Examiner*—Louis J. Casaregola

[57] ABSTRACT

A system and method are provided for recovering heat from the exhaust gas of a gas turbine operating in a combined cycle power plant. Heat is recovered by transferring it to feedwater supplied to a heat recovery steam generator. The heat recovery steam generator generates steam for expansion in a steam turbine, thereby producing additional rotating shaft power, and injection into the combustor of the gas turbine, thereby reducing nitrogen oxides in the exhaust gas. Feedwater from the condenser is entered directly into a feedwater heater in the heat recovery steam generator, thus avoiding the use of steam for feedwater heating. Acid corrosion is avoided by regulating the heat transferred from the exhaust gas to the feedwater heater in the event high sulfur fuel is burned in the gas turbine combustor.

14 Claims, 3 Drawing Sheets

SYSTEM AND METHOD FOR HEAT RECOVERY IN A COMBINED CYCLE POWER PLANT

BACKGROUND OF THE INVENTION

1. Field of the Invention

This invention relates generally to a method for generating steam by recovering heat from the exhaust gas of a gas turbine operating in a combined cycle power plant. The steam is expanded in one or more steam turbines which, together with the gas turbine, produce electrical power.

2. Description of the Prior Art

The low capital cost, short lead times and flexibility of gas turbine-based power plants make them particularly attractive to electrical utilities as a means for generating electrical power. Unfortunately, the inefficiency of a gas turbine standing alone, referred to as a simple cycle system, is relatively low compared to conventional fired boil steam turbine systems. The major source of this inefficiency is inherent in the Brayton cycle on which the gas turbine operates. The Brayton cycle operates in three phases—first, work is performed on the fluid (air in the case of a gas turbine) by isentropic compression in a compressor; second, heat is added to the fluid isobarically in a combustor; and, third, the hot compressed fluid is isentropically expanded back down to its initial pressure in the turbine. During the expansion phase much of the energy imparted to the fluid as a result of the compression and heating is recovered in the form of useful work. However, a significant portion of the energy remains in a relatively high-temperature, low-pressure form which, as a practical matter, cannot be recovered by further expansion in the turbine. In a simple cycle system this energy is lost to the atmosphere when the gas exhausting from the gas turbine is vented to atmosphere. The magnitude of this energy loss can be appreciated by noting that in a typical simple cycle system, air inducted into the compressor at ambient temperature is heated to approximately 2000° F. in the combustor prior to expansion in the turbine but is only cooled to approximately 1000° F. when vented to atmosphere after expansion in the turbine. Thus, the portion of the fuel burned in the combustor which was used to raise the temperature of the ambient air to 1000° F. is wasted, resulting in poor overall thermodynamic efficiency.

Consequently, substantial effort has been expended in developing methods for recovering the energy available in the gas exhausting from a gas turbine. One of the most successful methods involves the transfer of latent heat from the hot exhaust gas to pressurized feedwater in a heat recovery steam generator (hereinafter HRSG). The HRSG generates steam which is expanded in a steam turbine producing additional rotating shaft power. Since steam turbines operate on the Rankine cycle, rather than the Brayton cycle, power plants employing such a heat recovery method are termed combined cycle power plants.

Typically, a HRSG is comprised of a large duct through which the exhaust gas flows. The duct encloses banks of tubes through which the water/steam flows and over which the gas turbine exhaust gas flows. The surfaces of the tubes provide heat transfer surfaces There are three basic components in which heat is transferred in a typical HRSG, each comprised of a bundle of tubes: an economizer in which the feedwater is heated to near-saturation temperature; an evaporator in which the water heated in the economizer is converted to steam; and a superheater in which the temperature of the saturated steam from the evaporator is raised into the superheat region.

In order to obtain maximum efficiency of the steam turbine, it is desirable to generate steam at a high temperature and pressure. However, unless supplemental fuel is burned in the exhaust gas, an inefficient practice, the steam temperature is limited to the temperature of the exhaust gas entering the HRSG. The maximum pressure of the steam is also limited by the temperature of the exhaust gas since the saturation temperature of steam increases with its pressure and only the portion of the heat in the exhaust gas which is above the saturation temperature of the water in the evaporator can be used to generate steam. Hence, although increasing steam pressure increases steam turbine efficiency, it also reduces the quantity of the steam generated. Thus maximum heat recovery, and therefore maximum plant power output, are obtained by optimizing the relationship between the steam pressure and steam flow.

One optimization method utilizes a HRSG which generates steam at multiple pressure levels by employing a separate evaporator at each pressure level. The gas turbine exhaust gas is directed to the highest pressure evaporator first, then each successive lower pressure level evaporator. Thus, although the temperature of the gas entering the evaporator decreases at each successive pressure level, the saturation pressure and hence saturation temperature of the water in each successive evaporator is also reduced, so that additional steam may be produced at each pressure level.

Thus, it is desirable to devise a method of heat recovery which employs the optimum number of pressure levels, each operating at its optimum pressure, and which utilizes the steam produced at each pressure level in the optimum manner.

In many earlier combined cycle power plants, feedwater returned from the condenser at low temperature was not entered directly into the HRSG for heating prior to deaeration. Instead, feedwater heating was accomplished indirectly, using steam generated in a low-pressure evaporator or extracted from an intermediate stage of a low-pressure steam turbine. Although such methods ensured that the exhaust gas would not be cooled below its acid dew point temperature, they limited the amount of heat which could be recovered from the exhaust gas and reduced the steam available to generate electrical power.

Thus, it would be desirable to devise a method of heating the feedwater using heat removed from the exhaust gas directly, and to do so without encountering the dangers of acid corrosion due to excessive cooling of the exhaust gas in the HRSG.

SUMMARY OF THE INVENTION

Accordingly, it is the general object of the present invention to provide a means for recovering heat from the exhaust gas of gas turbine and utilizing such recovered heat to generate steam.

More specifically, it is an object of the present invention to provide a means for recovering as much heat as possible from the exhaust gas of a gas turbine without reducing the temperature of the exhaust gas below its acid dew point temperature. Moreover, such means must allow for variations in the acid dew point temperature resulting from variations in the sulfur content of the fuel burned in the gas turbine.

It is another object of the invention to utilize the steam generated as efficiently as possible, maximizing the steam expanded in the steam turbine and minimizing the steam used for feedwater heating.

It is still another object of the invention to generate sufficient steam for injection into the combustor of a gas turbine to reduce the concentration of nitrogen oxides in the exhaust gas to acceptable levels.

Briefly, these and other objects of the present invention are accomplished in a HRSG having a deaerator, feedwater heater and three boiler sections, each boiler section operating at a different pressure level. In accordance with the invention, when low sulfur fuel is burned, all of the heat necessary for deaeration is provided by the feedwater heater so that all of the steam generated in the low-pressure boiler section can be expanded in a low-pressure steam turbine, producing useful power. When high sulfur fuels are burned, the amount of heat recovered in the feedwater heater is reduced by decreasing the flow rate of feedwater to the heater, thereby avoiding excessive cooling of the exhaust gas and the attendant acid condensation. Steam bled from the low-pressure boiler section compensates for any short fall in the heat necessary for deaeration.

In accordance with the invention, all of the steam produced in the medium-pressure boiler section is injected into the gas turbine combustor, reducing the concentration of nitrogen oxides in the exhaust gas and producing additional power. All of the steam produced in the high-pressure boiler section is expanded in a high-pressure steam turbine providing a source of rotating shaft power. In addition, steam produced in the low-pressure boiler section is expanded in a low-pressure steam turbine, contributing to the power production.

DESCRIPTION OF THE PREFERRED EMBODIMENT

Figure 1:
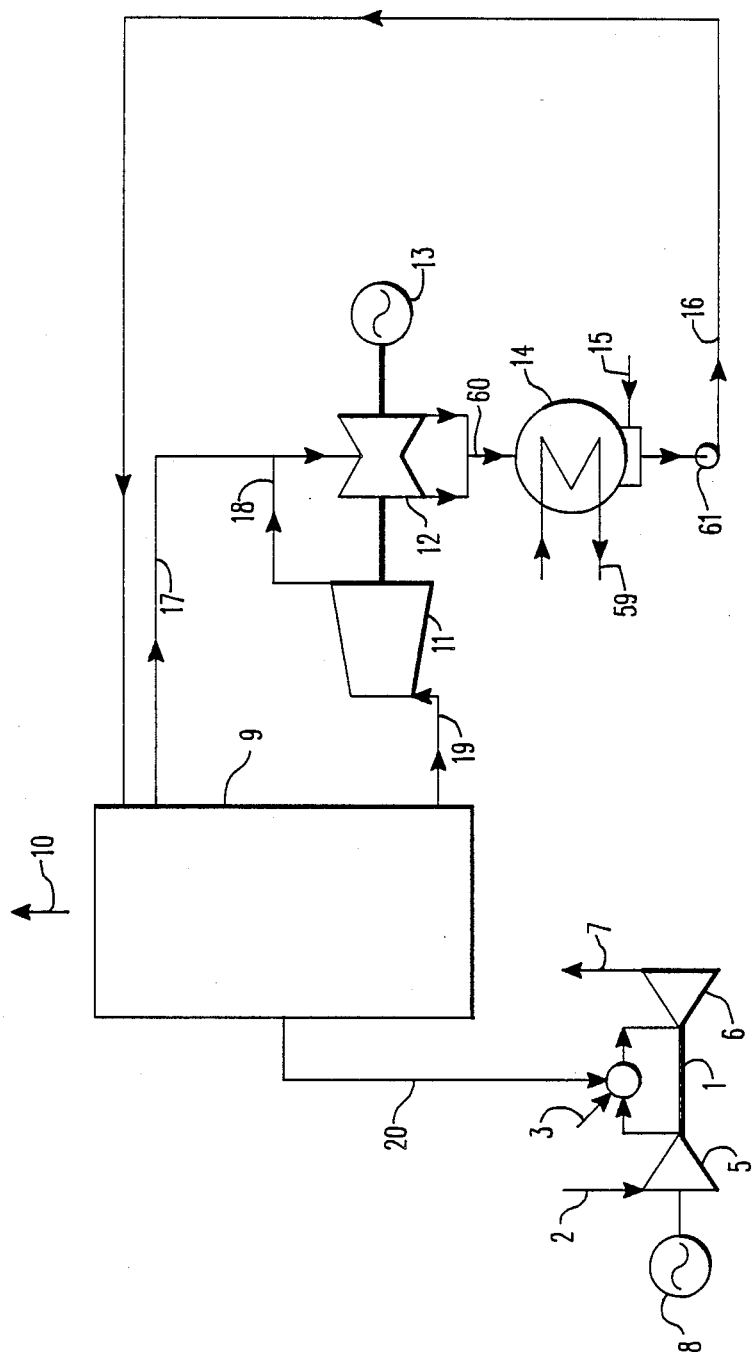
FIG. 1 is a schematic diagram of a combined cycle power plant.

FIG. 1 shows a schematic diagram of a combined cycle power plant. Ambient air 2 is inducted into the compressor 5 of a gas turbine 1. The compressed air is then heated in a combustor 4 by burning fuel 3. The fuel may be in a liquid or gaseous form, and is typically No. 2 distillate oil or natural gas. The heated compressed gas is then expanded in the turbine section 6 of the gas turbine, producing power to drive the compressor 5 as well as a dynamo electric machine 8, thereby generating electrical power. The spent exhaust gas 7 is then ducted to a HRSG 9. After leaving the HRSG the exhaust gas 10 is vented to atmosphere.

The HRSG receives feedwater 16 and, by 7, converts the feedwater into steam at three different pressure levels. Medium-pressure steam 20 is injected into the combustor 4 of the gas turbine As is well known in the art, such steam injection reduces the concentration of nitrogen oxides in the exhaust gas, thereby enabling the combined cycle power plant to satisfy local air pollution requirements. In addition, the steam increases the mass flow of the gas expanded in the turbine section 6 of the gas turbine, thereby increasing the power output of the turbine.

High-pressure steam 19 is supplied to a high-pressure steam turbine 11. The steam 18 exhausted from the high-pressure steam turbine is combined with low-pressure steam 17, generated by the HRSG, and inducted into a double-flow low-pressure steam turbine 12. The high-pressure and low-pressure steam turbines drive a common shaft which turns a second dynamo electric machine 13, producing additional electrical power. The steam 60 exhausting from the low-pressure steam turbine is liquified in a condenser 14 by transferring heat from the steam to circulating water 59. The circulating water is typically obtained from a nearby lake or river or may be recirculated and cooled through atmospheric cooling towers (not shown). The liquified steam is mixed in the condenser hotwell with make-up water 15. The quantity of the make-up water is sufficient to compensate for losses due to blowdown from the steam drums and leakage throughout the system as well as the medium-pressure steam injected into the gas turbine combustor. The condensed steam and make-up water are drawn from the condenser by pump 61 and form the feedwater 16 which enters the HRSG, providing, except for the steam injection and make-up water, an essentially closed-loop system.

Figure 2:
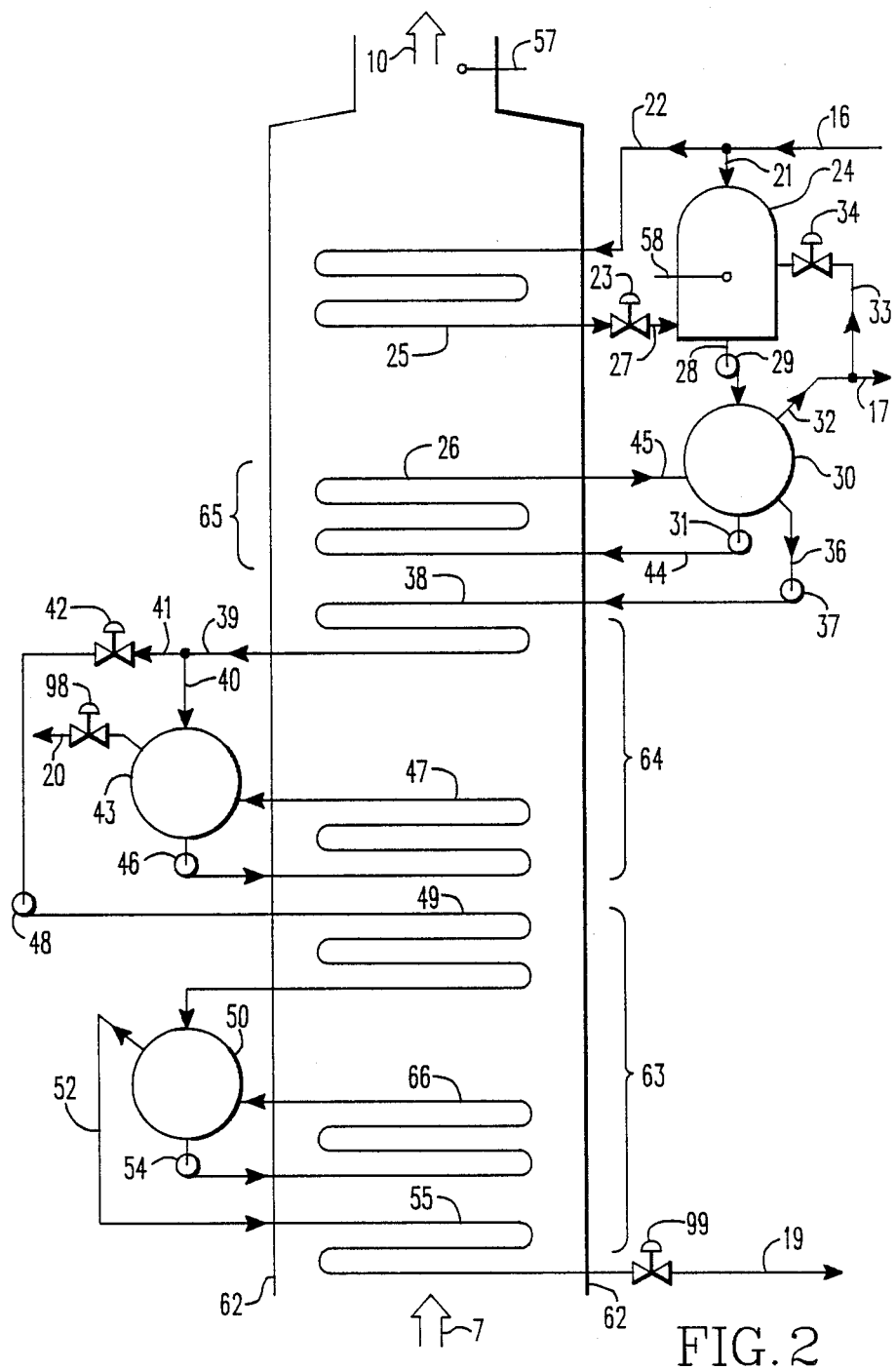
FIG. 2 is a schematic diagram of the HRSG portion of the combined cycle power plant shown in FIG. 1.

FIG. 2 shows a schematic diagram of the HRSG 9 shown in FIG. 1. The HRSG duct 62 receives exhaust gas 7 from the gas turbine and discharges the gas 10, after recovering useful heat therefrom, to the atmosphere. The HRSG is comprised of three boiler sections 63, 64, and 65, a feedwater heater 25 and a deaerator 24. The gas exhausting from the gas turbine flows over the high-pressure boiler section 63 first, then the medium-pressure boiler section 64, then the low-pressure boiler section 65 and lastly the feedwater heater 25.

Since the quantity of make-up water needed is small compared to the flow rate of condensed steam, the temperature of the feedwater is very close to that of the condensate. The temperature of the condensate is the saturation temperature of the steam when it liquifies and hence is a function of the pressure in the condenser. Since maximum steam turbine power is produced by expanding the steam to as low a pressure as possible, such condensers usually operate at subatmospheric pressure. Hence, feedwater temperatures are usually in the 26°-38° C. (80°-100° F.) range (range in steam saturation temperature corresponding to pressures in the 3-10 kPa absolute (1-3 inches HGA) range).

As a result of leakages of air into the system, oxygen and other non-condensable gases are dissolved in the feedwater. These must be removed before returning the feedwater to the HRSG in order to avoid corrosion of the equipment. In combined cycle power plants gas removal is accomplished in a vessel, termed a deaerator, which vents the removed gases to atmosphere. In accordance with the present invention, the feedwater 16 supplied to the HRSG is split into two streams 21 and 22, shown in FIG. 2. Stream 21 enters the deaerator 24, which may be of the spray tray type, directly, while stream 22 enters a feedwater heater 25. Feedwater splitter valve 23, disposed in a pipe transporting the feedwater discharged from the feedwater heater 25, regulates the relative quantity of flow in each stream.

Feedwater heater 25 is immersed in the exhaust gas near the discharge end of the HRSG, as shown in FIG.

2, and is comprised of one or more rows of tubes through which feedwater stream 22 flows and over which the exhaust gas from the gas turbine flows. The tubes provide heat transfer surfaces which facilitate the heating of the feedwater. As a result of the action of pump 61, shown in FIG. 1, the pressure of the water in the feedwater heater is high enough to insure that the temperature of the water in the feedwater heater remains below its saturation temperature. Hence, the feedwater heater produces hot water, but no steam is generated therein.

In order to reduce gas solubility, the water to be deaerated must be heated to its saturation temperature. Feedwater heater 25 forms a heat source for the deaerator by discharging the heated water 27 into the deaerator 24 where it mixes with the unheated feedwater which formed stream 21. In order to facilitate the driving off of the gases, deaerators must be operated above atmospheric pressure. However, the higher the pressure in the deaerator the higher the saturation temperature and hence the greater the heat input required. Thus, in the preferred embodiment the deaerator pressure is maintained in the 140–210 kPa absolute (20–30 psia) range so that the saturation temperature which must be achieved is in the 110°–120° C. (230°–250° F.) range. Pressure in the deaerator is maintained by regulating the heat input to the deaerator—too much heat input will cause a large portion of the water in the deaerator to convert to steam resulting in excessive pressure. Too little heat input will drop the temperature of the water below saturation temperature and result in insufficient pressure for good deaeration.

According to the current invention, the desired pressure is maintained in the deaerator by operating the feedwater splitter valve 23 to regulate the relative quantities of heated 27 and unheated 21 feedwater entering the deaerator. It is important to note that the feedwater heater has sufficient heat transfer area to enable it to supply all of the heat required to heat the feedwater in the deaerator when the combined cycle power plant is operating at the maximum feedwater flow rate.

The deaerated water 28 is then drawn off the deaerator and, after its pressure is increased by pump 29, it enters the steam drum 30 of the low-pressure boiler section 65. The low-pressure boiler section is comprised of a steam drum 30, a circulating pump 31 and an evaporator 26. The steam drum 30 acts as a storage reservoir for the circulating pump 31 and also serves to separate the steam from the steam/water mixture discharged by the evaporator 26. The circulating pump 31 draws water from the steam drum 30 and forces it through the evaporator 26. The evaporator 26 consists of one or more rows of tubes immersed in the exhaust gas flow. The exhaust gas flows over the tubes and the tube surfaces act as heat transfer surfaces for heating the water. There is sufficient heat transfer area in the tubes to convert a portion of the water 44 circulating in the evaporator to steam. The water/steam mixture 45 discharged by the evaporator re-enters the steam drum where the steam is separated from the water. The steam 32 leaves the drum. A portion 44 of the water re-enters the evaporator and the balance 36 is drawn from the drum by pump 37 for entry into the medium-pressure boiler section 64. Since by the time the exhaust gas reaches the low-pressure evaporator it has already given up much of its heat in boiler sections 63 and 64, the pressure in the low-pressure evaporator, and the hence the saturation temperature, should be maintained at a relatively low value in order to obtain adequate steam generation. In the preferred embodiment the pressure in the low-pressure evaporator is maintained in the 207–480 kPa absolute (30–70 psia) range.

Except when high sulfur fuels are burned as discussed below, all of the steam 32 produced in the low-pressure boiler section is transported from the steam drum 30 to the low-pressure steam turbine 12 for induction therein, thereby producing additional electrical power in dynamo-electric machine 13. Thus the scheme disclosed, wherein all the feedwater heating necessary for deaeration is accomplished by the direct transfer of heat from the exhaust gas to the feedwater heater, provides a significant advantage over many earlier combined cycle power plants in which a considerable portion of the low-pressure steam generated in a low-pressure evaporator was used to heat the feedwater prior to deaeration. Such use of low-pressure steam for feedwater heating not only robs power from the low-pressure steam turbine, it reduces the amount of heat which can be removed from the exhaust gas. This is so because the temperature of the water in a low-pressure evaporator is essentially at its saturation temperature $-120°$ C. (250° F.) in the case of a low-pressure evaporator operating at 345 kPa absolute (50 psia). Hence none of the heat in the exhaust gas below 120° C. (250° F.) can be recovered by transferring it to the water circulating in the low-pressure evaporator tubes. However, it must be noted that this limitation in exhaust heat recovery was deemed necessary in many earlier combined cycle power plants in order to avoid acid corrosion of the HRSG, as explained below. In contrast, the method disclosed herein uses feedwater from the condenser as a heat sink. Since, as previously explained, this feedwater is in the 26°–38° C. (80°–100° F.) range, a significantly greater amount of heat may be recovered from the exhaust gas.

The exhaust gas from the gas turbine is comprised of air and the products of combustion of the fuel burned, including water vapor and sulfur trioxide. A portion of the water and sulfur trioxide combine to form sulfuric acid. If the temperature of the exhaust gas drops below a certain temperature, referred to as the acid dew point, the sulfuric acid will condense in the HRSG, causing harmful corrosion. The acid dew point is a function of the concentration of sulfur trioxide in the exhaust gas which, in turn, is a function of the concentration of sulfur in the fuel burned. The higher the sulfur concentration, the higher the acid dew point, and hence the higher the minimum exhaust gas temperature which may be safely obtained. Consequently, care must be taken to ensure that the quantity of heat transferred from the exhaust gas is not great enough to reduce its temperature below the acid dew point. This situation is complicated by the fact that many gas turbines burn a variety of fuels and can automatically switch from natural gas to oil fuel without shutting down. Even if the type of fuel burned remains constant, sulfur content may vary over time, in the case of pipeline gas, or among batches received, in the case of liquid fuel. Hence the acid dew point may vary from under 93° C. (200° F.). for clean natural gas to over 150° C. (300° F.) for high sulfur No. 2 distillate oil. A maximum acid dew point for operation on any given fuel can be calculated by measuring the sulfur concentration in the fuel and combining this with the maximum expected fuel consumption rate and the minimum compressor air flow rate to determine the maximum concentration of sulfur trioxide in the exhaust gas. The acid dew point can be calculated from the sulfur trioxide concentration using well known methods, for example, see "Estimating Acid Dew Points in Stack Gases", *Chemical Engineering,* Apr. 11, 1977 by R. Pierce.

Figure 3:
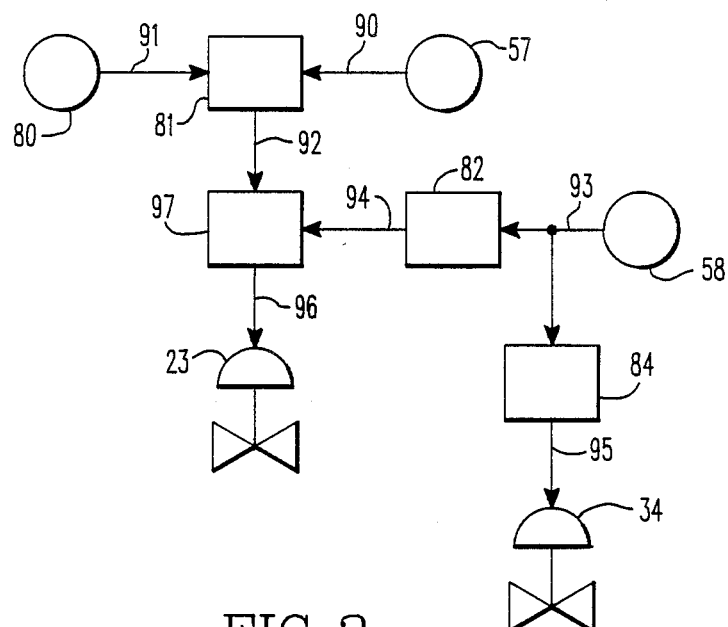
FIG. 3 is a schematic diagram of the feedwater splitter valve and low-pressure steam bleed valve control system.

The feedwater heating system disclosed herein is capable of obtaining very low exhaust gas temperatures at the discharge 10 from the HRSG. In the preferred embodiment a gas discharge temperature of 93° C. 200° F.) is achieved. Accordingly, a control scheme has been devised to prevent excessive cooling of the exhaust gas when high sulfur fuels are burned. The scheme features a deaerator pressure control loop and a HRSG gas temperature control loop. FIG. 3 shows a schematic diagram of the control scheme. The deaerator pressure control loop operates as follows. Pressure sensor 58, which may be a transducer, senses pressure in the deaerator and generates a signal 93 whose amplitude corresponds to the pressure sensed. Device 82 receives the signal and compares it to a predetermined value corresponding to the desired deaerator pressure (in the preferred embodiment approximately 145 kPa absolute (21 psia)). If the amplitude of the signal differs from the predetermined value, device 82 generates a signal 94 which corresponds to whether the flow rate to the feedwater heater 25 should be reduced, because the deaerator pressure is too high, or the flow rate to the feedwater heater should be increased, because the deaerator pressure is too low. Device 97 receives the signal 94 and, unless signal 92 has also been received by device 97 for reasons discussed below, device 97 generates a signal 96 which operates on the feedwater splitter valve 23 to increase or decrease the flow rate through the feedwater heater and therefore, the heat input to the deaerator. As previously explained, the pressure in the deaerator is maintained by regulating the heat input to the deaerator.

The HRSG gas temperature control loop operates as follows. Device 80 allows the input of a temperature set point corresponding to the minimum temperature allowable to avoid acid condensation. In the preferred embodiment this is 10° F. higher than the maximum acid dew point, calculated as previously explained based on the sulfur concentration in the fuel being burned. Device 80 generates a set point signal 91 whose amplitude corresponds to the temperature set point entered. Temperature sensor 57, which may be a thermocouple, is disposed in the HRSG discharge gas flow and generates a signal 90 whose amplitude corresponds to the temperature sensed. Device 81 receives and compares the set point and the temperature sensed signals and determines their difference. If this difference indicates the gas temperature has dropped below the set point temperature, device 81 generates a signal 92 which is received by device 97 causing it to ignore signal 94, from the deaerator pressure control loop, and generates a signal 96 to operate the feedwater splitter valve 23 to reduce the flow rate through the feedwater heater 25 until the gas temperature reaches the set point value. Thus, cooling of the exhaust gas below its acid dew point is avoided.

Reliance on the control scheme discussed above may result in inadequate heat input to the deaerator 24 because of low flow through the feedwater heater when high sulfur fuel is burned. To compensate for this loss of deaerator heat input, a scheme has been devised whereby the low-pressure evaporator 26 acts as a secondary heat source for the deaerator 24. Referring again to FIG. 3, it can be seen that signal 93 from the deaerator pressure sensor 58 is also received by device 84. Device 84 compares the amplitude of signal 93 to a predetermined value corresponding to the minimum acceptable deaerator pressure for good deaeration, in the preferred embodiment this value is 124 kPa absolute (18 psia). If the amplitude of the signal is less than the predetermined value, indicating that as a result of regulation of feedwater splitter valve 23 insufficient water is being received by the deaerator 24 from the feedwater heater 25 to maintain deaerator pressure, device 84 generates a signal 95 which operates a bleed valve 34. As shown in FIG. 2, bleed valve 34 is disposed in a pipe 33 which draws steam from the low-pressure steam 32 generated by the low-pressure evaporator. Opening bleed valve 34 allows a portion of this steam to be supplied to the deaerator for feedwater heating. Thus, adequate deaeration may be achieved with minimum use of steam for feedwater heating, thereby maximizing steam turbine power generation, and acid corrosion is avoided regardless of the sulfur content of the fuel.

Referring again to FIG. 2, it can be seen that the feedwater stream 36, which represents the portion of the feedwater 28 transferred to the low-pressure boiler section 65 which is not converted to steam 32, is transferred to medium-pressure boiler section 64 after its pressure is raised in pump 37. The medium-pressure boiler section is comprised of an economizer 38, a steam drum 43, a circulating pump 46, and an evaporator 47. The economizer 38 and evaporator 47 are arranged so that the exhaust gas flows over the evaporator first and then the economizer. Water from pump 37 flows through economizer 38, which consists of one or more rows of tubes, and absorbs heat from the exhaust gas. The tubes in the economizer provide sufficient heat transfer surface area to heat the water to close to its saturation temperature. In order to maintain maximum heat recovery, it is desirable to transfer as much heat as possible in the economizer. However, the temperature of the water must remain below its saturation temperature to avoid steam formation, which impedes the flow of water through the economizer. In the preferred embodiment the water in the economizer is heated to 3° C. (5° F.) below its saturation temperature. Water 39 discharged from the economizer 38 is split into flow streams 41 and 40 by flow control valve 42. Flow stream 40 enters the steam drum 43 and is circulated by pump 46 through the evaporator 47. Medium-pressure evaporator 47 is similar to low-pressure evaporator 26 and has sufficient heat transfer surface area to generate all the steam required for control of nitrogen oxides in the gas turbine exhaust. The steam 20 generated is transferred from the drum 43 of the medium-pressure boiler section to the combustor 4 of the gas turbine. The steam 20 must have sufficient pressure to allow it to be sprayed into the compressed gas in the combustor. Since most modern gas turbines operate with compressor discharge pressures in the 1035–1725 kPa absolute (150–250 psia) range, in the preferred embodiment the pressure in the medium-pressure boiler section is maintained in the 2070–2410 kPa absolute (300–350 psia) range by a pressure-regulating valve 98.

Flow stream 41 from the discharge of the medium-pressure economizer 38 is transferred to the high-pressure boiler section 63 after its pressure has been raised by pump 48. The high-pressure boiler section 63 is comprised of an economizer 49, a steam drum 50, evaporator 66, a circulating pump 54 and a superheater 55. These components are arranged so that the exhaust gas flows first over the superheater, then the evaporator and then the economizer. The economizer, steam drum, evaporator and circulating pump function as previously described in the medium-pressure boiler section. The superheater 55 consists of one or more rows of heat transfer tubes and serves to raise the temperature of the saturated steam 52, removed from the steam drum 50, into the superheat region. The superheated high pressure steam 19 is then delivered to the high-pressure steam turbine 11. The pressure of the high-pressure boiler section, maintained by a pressure-regulating valve 99, should be kept as high as possible to obtain maximum high-pressure steam turbine efficiency. However, increasing the pressure in the high-pressure boiler section increases the saturation temperature of the water in the high-pressure evaporator 66 and hence decreases steam generation. In the preferred embodiment the optimum high-pressure steam pressure is in the 6200–6900 kPa absolute (900–1000 psia) range and the high-pressure boiler section has sufficient heat transfer surface area to convert all of the feedwater remaining, after low-pressure steam turbine steam induction and gas turbine steam injection, to high-pressure steam. The maximum temperature of the steam produced by the superheater is limited to the temperature of the gas exhausting from the gas turbine, since in most modern gas turbines this temperature is approximately 540° C. (1000° F.), in the preferred embodiment the superheater has sufficient heat transfer surface area to raise the temperature of the steam generated in the high-pressure boiler section into the 480°–510° C. (900°–950° F.) range.

Figure 4:
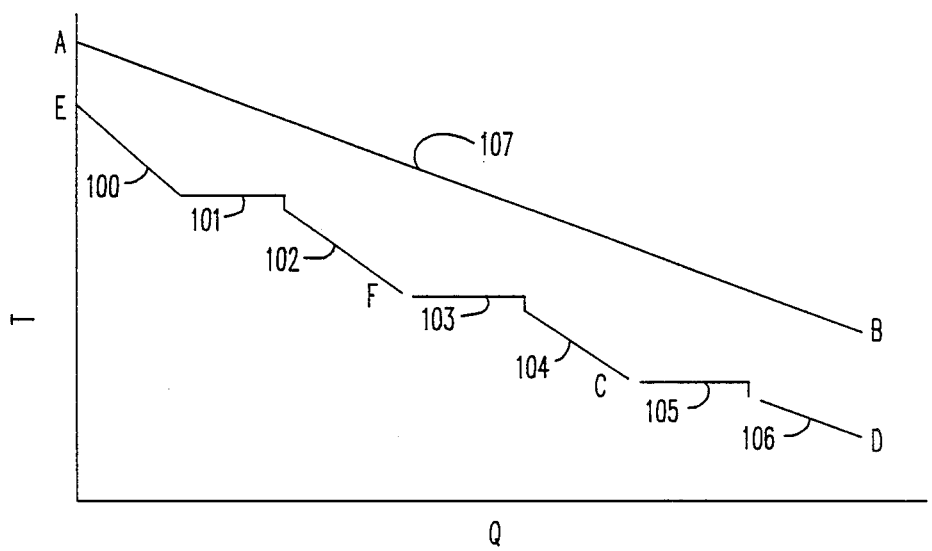
FIG. 4 is a heat transfer diagram for the HRSG.

Thus, as the foregoing indicates, the ordering of the various HRSG components within the exhaust gas flow has been chosen so that heat may be extracted by each component, even though the temperature of the exhaust gas is decreasing as it flows through the HRSG. The pressure level at which each boiler section operates has been selected to maximize steam generation and, unless high sulfur fuels are burned, all of the steam is used to generate electrical power. These principles are shown in FIG. 4 which is a heat transfer diagram for the HRSG. The axes of the diagram are temperature, denoted T, and heat transfer, denoted Q. The upper line 107 represents the heat released from the exhaust gas as it flows through the HRSG. The gas enters the HRSG at temperature A, approximately 540° C. (1000° F.) in the preferred embodiment, and discharges from the HRSG at temperature B, approximately 93° C. (200° F.) in the preferred embodiment. The lower line represents the heat absorbed by the feedwater. Each segment of the lower line represents heat transfer in one of the HRSG components; 100 is the superheater; 101 is the high-pressure evaporator; 102 is the high-pressure economizer; 103 the medium-pressure evaporator; 104 the medium-pressure economizer; 105 the low-pressure evaporator; and 106 the feedwater heater. The feedwater enters the HRSG at temperature D (26°–38° C. (80°–100° F.) in the preferred embodiment) and exits as low-pressure steam at temperature C (120°–150° C. (250°–300° F.) in the preferred embodiment), medium-pressure steam at temperature F (200°–230° C. (400°–450° F.) in the preferred embodiment) and high-pressure steam at temperature E (480°–510° C. (900°–950° F.) in the preferred embodiment. As can be seen, the operating pressure (and hence saturation temperature) and the steam generation rate at each boiler section has been selected to maintain a sufficient temperature gradient between the exhaust gas and steam/water flow to ensure good heat transfer By way of illustration, applying the principles disclosed herein to a combined cycle power plant utilizing a gas turbine producing 1,315,500 kg/hr (2,900,000 lb/hr) of exhaust gas at 524° C. (976° F.), the steam generation from the HRSG was calculated to be as follows:

(i) 156,000 Kg/hr (344,000 lb/hr) of high-pressure steam at 498° C. and 6720 KPa absolute (928° F. and 975 psia);

(ii) 14,050 Kg/hr (31,000 lb/hr) of medium-pressure steam at 215° C. and 2170 KPa absolute (420° F. and 315 psia); and (iii) 29,500 Kg/hr (65,000 lb/hr) of low-pressure steam at 138° C. and 345 KPa absolute (281° F. and 50 psia).

Many modifications and variations of the present invention are possible in light of the above techniques. It is therefore to be understood that within the scope of the appended claims, the invention may be practiced otherwise than as specifically described.

I claim:

1. In a combined cycle power plant having a gas turbine, a steam turbine, and a heat recovery steam generator, a method of recovering heat from the exhaust gas of said gas turbine in said heat recovery steam generator comprising the steps of:
(a) supplying water, splitting said water supplied into first and second streams, directing said first stream to a vessel, directing said second stream to a feedwater heater, transferring heat from said exhaust gas to said second stream in said feedwater heater, directing said second stream after said heating in said feedwater heater to said vessel, said heated water providing a first source of heat input to said vessel, mixing said first and second streams in said vessel, thereby producing heated feedwater;
(b) regulating the relative quantities of said first and second streams of said water supplied so as to maintain a predetermined pressure in said vessel; and
(c) venting from said vessel gases released from said heated feedwater mixture.

2. The method according to claim 1 further comprising the steps of directing said heated feedwater to a boiler section, transferring heat from said exhaust gas to said feedwater in a first evaporator of said boiler section, whereby a first portion of said feedwater in said boiler section is converted into steam.

3. The method according to claim 2 further comprising the step of bleeding a portion of said steam generated in said first boiler section and directing said bled portion to said vessel, said bleeding to occur only if the pressure in said vessel falls below a predetermined value, said bled steam providing a second source of heat input to said vessel.

4. The method according to claim 3 further comprising the steps of:
(a) sensing the temperature of said exhaust gas after said heat has been transferred from said exhaust gas in said feedwater heater; and
(b) reducing said heat transferred from said exhaust gas in said feedwater heater in step 1(a) in the event said temperature sensed in step 4(a) drops below a preselected value.

5. The method according to claim 4 wherein the step of reducing said heat transferred comprises the step of reducing the quantity of said water supplied which is split into said second stream in step 1(a), thereby reducing the quantity of said water directed to said feedwater heater.

6. The method according to claim 5 further comprising the step of determining said preselected value in step 4(b) based on the sulfur content of fuel burned in said gas turbine.

7. The method according to claim 6 further comprising the steps of:
   (a) flowing a second portion of said feedwater in said boiler section through a first pump, thereby increasing the pressure of said second portion of said feedwater;
   (b) directing said feedwater flowed, through said first pump to a first economizer, transferring heat from said exhaust gas to said feedwater in said first economizer, directing a first portion of said feedwater heated in said first economizer to a second evaporator, transferring heat from said exhaust gas to said feedwater in said second evaporator, whereby said feedwater is converted to steam; and
   (c) flowing a second portion of said feedwater heated in said first economizer through a second pump, thereby further increasing the pressure of said feedwater, directing said feedwater flowed through said second pump to a second economizer, transferring heat from said exhaust gas to said feedwater in said second economizer, directing said feedwater heated in said second economizer to a third evaporator, transferring heat from said exhaust gas to said water in said third evaporator, whereby said feedwater is converted to steam.

8. The method according to claim 7 further comprising the step of directing said exhaust gas to flow over the aforementioned components in the following sequence: over said third evaporator first, then over said second economizer, then over said second evaporator, then over said first economizer, then over said first evaporator, then lastly over to said feedwater heater.

9. The method according to claim 8 comprising the further step of directing a portion of said steam generated in said boiler section in step 2 which is in excess of said steam bled in step 3 to a first portion of said steam turbine.

10. The method according to claim 9 further comprising the step of directing said steam generated in said second evaporator in step 7(b) to a combustion chamber of said gas turbine.

11. The method according to claim 10 comprising the further steps of:
   (a) directing said steam generated in said third evaporator in step 7(c) to a superheater;
   (b) transferring heat from said exhaust gas to said steam in said superheater, whereby the temperature of said steam is raised into the superheat; region, and
   (c) directing said superheated steam to a second portion of said steam turbine.

12. The method according to claim 11 wherein the step of maintaining the pressure in said vessel in step (1)b further comprises the step of maintaining said pressure within the range of 140–210 KPa absolute.

13. The method according to claim 12 further comprising the step of maintaining the pressure in said second evaporator in the range of 2070–2410 KPa absolute.

14. The method according to claim 13 further comprising the step of maintaining the pressure in said third evaporator in the range of 6200–6900 KPa absolute.

* * * * *